Patented July 8, 1952

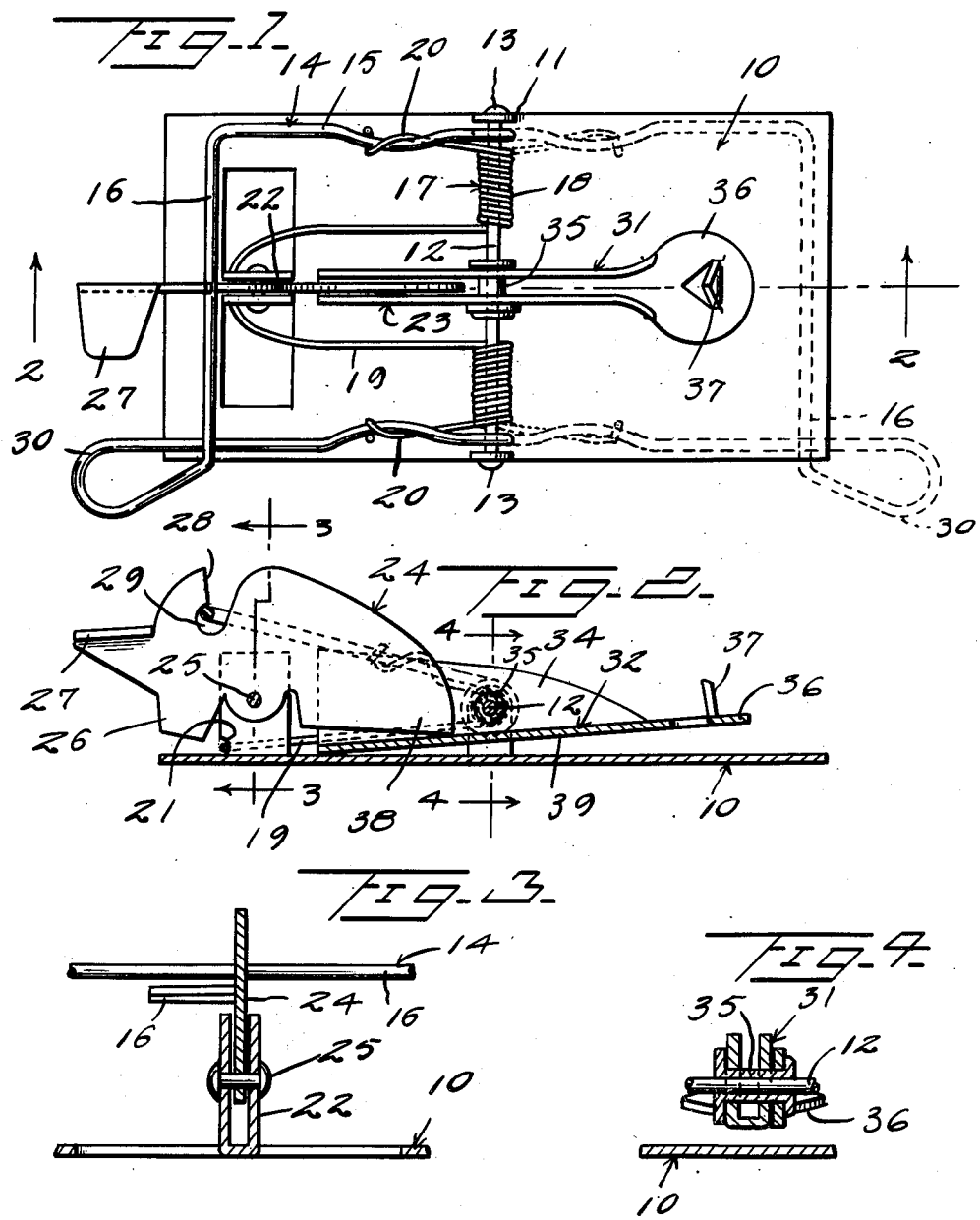

2,602,260

UNITED STATES PATENT OFFICE 2,602,260

RODENT TRAP

Jeremiah Marsden, Mulino, Oreg.

Application March 19, 1948, Serial No. 15,750

1 Claim. (Cl. 43—81.5)

This invention relates to rodent traps.

An object of this invention is to provide a rodent trap embodying a spring tensioned striker with a two-part trigger which is so constructed and arranged that the striker will be automatically locked in set position upon upward and rearward swinging thereof with the base tilted or inclined downwardly and forwardly.

Another object of this invention is to provide a trap of this kind which will firmly lock the striker in set position so that slight jars will not release the striker, while at the same time the trigger is exceedingly sensitive to light touches or weights.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a top plan view of a rodent trap constructed according to an embodiment of this invention, showing the striker in set position.

Figure 2 is a sectional view taken on the line 2-2 of Figure 1.

Figure 3 is a fragmentary sectional view taken on the line 3-3 of Figure 2.

Figure 4 is a fragmentary sectional view taken on the line 4-4 of Figure 2.

Referring to the drawing, the numeral 10 designates generally a base member of rectangular configuration which may be formed out of any suitable material. In the present instance the base member 10 is formed out of metal and has struck upwardly from the opposite longitudinal edges thereof a pair of upright ears 11 through which a shaft or pin 12 is extended, the opposite ends of the shaft or pin 12 being upset as at 13. The shaft 12 has rockably mounted thereon a U-shaped striker 14, the striker 14 having the parallel legs 15 thereof extending lengthwise of the base 10 and the bight or connecting bar 16 extending transversely of the base 10. A coil spring, generally designated as 17, engages about the shaft 12 and in the present instance, the spring 17 is constructed in the form of a pair of spaced coils 18 connected together by an elongated loop 19 and the outer ends of the springs 18 are twisted or wrapped partly about the legs 15 of the striker 14 as indicated at 20. The loop 19 extends rearwardly of the shaft 12, the latter being disposed in substantially the transverse median of the base 10 and the loop 19 engages in notches 21 which are formed in a pair of unstanding ears 22 struck from the base 10.

A two-part trigger structure, generally designated as 23, provides a means for releasably locking or holding the striker 14 in set position. The trigger 23 includes a rear trigger member 24 pivotally mounted on a pin 25 extending between the upright ears 22. The trigger member 24 has the pin 25 thereof extending therethrough at a point rearwardly of the transverse center so that the trigger member 24 will be overbalanced forwardly, the purpose for which will be hereinafter described.

The trigger member 24 is formed with a downwardly extending stop member 26 which, in the released position of the trigger member 24 is adapted to engage the upper side of the base 10. The trigger member 24 also includes a releasing lug 27 which is disposed at the rear end of the trigger member and the latter is formed with a notch 28 terminating in a curved keeper 29 within which the connecting bar 16 is adapted to releasably engage. The striker 14 as is seen in Figure 1 is formed with a looped handle or operating member 30 extending from one corner of the striker so that this striker may readily be swung unwardly and rearwardly to a setting or set position. The trigger 23 also includes a second trigger member 31 formed of an elongated member 32 which is substantially U-shaped in transverse section for the major portion of the length thereof.

The shaft 12 extends through the upright legs or sides 34 of the U-shaped member 32 and preferably a tubular rivet or bearing member 35 engages through the legs 34 with the shaft 12 extending through the bearing member or rivet 35. The forward end of the U-shaped member 32 is flared outwardly to form a disc-shaped bait holder 36 which has struck upwardly therefrom a tang 37 adapted to project into the bait for holding of the bait on the plate or holder 36. The forward end 38 of the trigger member 24 projects between the parallel sides 34 of the trigger member 31 and is adapted to engage the bight or connecting member 39 connecting the parallel sides 34 of the U-shaped member 32 together. The forward end 38 of trigger member 24 is disposed closely adjacent the shaft 12 and is adapted when the trap is in set position to press downwardly on the trigger member 31.

In the use of this trap the bait is placed on the holder 36, engaging the tang 37. The trap may be set by swinging the striker 14 upwardly and rearwardly and tilting the base 10 downwardly and forwardly. The striker 14 may then be extended into the notch or slot 28 and, due to the overbalancing of the rear trigger member 24 when the striker 14 is released, the striker will be firmly held in the keeper 29. The forward end 38 of the rear trigger member 24 will be spring-pressed downwardly to swing the rear end of the forward trigger member 31 downwardly and raise the forward end of the forward trigger member upwardly as shown in Figure 2. When a slight pressure has been applied to the bait holder 36, the lever or forward trigger member 31 will be rocked downwardly at its forward end raising the rear end thereof and raising the rear trigger member 24 to release the striker 14. The lug 27 carried by the rear trigger member 24 provides a means whereby the striker may be released from the trigger structure at the rear of the striker so that the striker will not pinch a finger between the base and the striker.

I claim:

A trap comprising a base, a U-shaped striker including recessed side legs and a connecting cross member, said side legs being pivotally mounted on said base, a looped handle integral with and projecting from the junction of said one leg and said cross member of said striker after projecting laterally, a coiled spring having a portion fixed relative to said base and the opposite ends thereof secured in said recesses in said side legs constantly urging said striker to rock forwardly to operative position, a trigger releasably locking said striker in set position, said trigger comprising a rear lug member formed with a keeper having an inwardly curved hook within which said striker is engageable when in set position, said rear lug member also having a depending apertured central portion and a depending front end portion, means comprising a pair of upstanding lugs having aligned apertures between which said depending central portion extends and a pivot pin extending through the aligned apertures, pivotally mounting said rear member on said base, said pivot pin engaging said rear member rearwardly of the transverse median thereof whereby said rear member will be overbalanced forwardly, said lugs being recessed to form the securing means for the fixed portion of said coil spring, said trigger also including an elongated forward member rockably carried by said base, said forward member including a longitudinally extending relatively narrow portion of U-shaped transverse section comprising a substantial portion of the length of said forward member, said rear member loosely engaging bentween the closely adjacent sides of said forward member and adapted when said striker is in set position to rock downwardly at its forward end to thereby raise the forward end of said forward member, said forward member including at its forward end a substantially circular flat bait holder including a centrally positioned up-struck integral bait engaging prong, said depending rear portion of said rear member comprising a stop engageable with said base for stopping the movement of said trigger after the striker is released, and a manually operable trigger releasable lug carried by said rear member rearwardly of said keeper, formed integrally therewith and extending laterally therefrom for rocking said rear member rearwardly to release said striker independently of said bait holder.

JEREMIAH MARSDEN.

REFERENCES CITED

The following references are of record in the file of this patent:

UNITED STATES PATENTS

| Number | Name | Date |
|---|---|---|
| 587,894 | West | Aug. 10, 1897 |
| 643,548 | Smith | Feb. 13, 1900 |
| 1,038,246 | Walters | Sept. 10, 1912 |
| 1,333,875 | Pokorny | Mar. 16, 1920 |
| 1,541,855 | Sands | June 16, 1925 |
| 2,064,188 | Wodarczyk | Dec. 15, 1936 |
| 2,065,701 | Houtsinger | Dec. 29, 1936 |

FOREIGN PATENTS

| Number | Country | Date |
|---|---|---|
| 420,243 | Great Britain | Nov. 28, 1934 |
| 608,061 | Germany | Jan. 15, 1935 |